United States Patent [19]

Orban et al.

[11] Patent Number: 5,253,967
[45] Date of Patent: Oct. 19, 1993

[54] ADAPTER ASSEMBLY FOR TENSIONING THREADED FASTENERS AND METHOD OF TENSIONING THREADED FASTENERS

[75] Inventors: Joseph N. Orban, South Plains; John A. Braun, Kenilworth, both of N.J.

[73] Assignee: Biach Industries, Cranford, N.J.

[21] Appl. No.: 789,509

[22] Filed: Nov. 8, 1991

[51] Int. Cl.⁵ .................. F16B 37/08; F16B 37/14; B23P 11/02
[52] U.S. Cl. .................. 411/432; 411/374; 411/917; 29/525.1; 403/408.1
[58] Field of Search ............ 411/432, 374, 429, 916, 411/917; 29/238, 525.1; 403/408.1

[56] References Cited

U.S. PATENT DOCUMENTS

| | | | |
|---|---|---|---|
| 984,863 | 2/1911 | Stafford | 411/374 |
| 1,086,737 | 2/1914 | Taylor . | |
| 1,965,412 | 7/1934 | Guy . | |
| 2,320,398 | 6/1943 | Zetterquist | 189/36 |
| 2,391,031 | 12/1945 | Muster . | |
| 2,571,265 | 10/1951 | Leufven | 411/917 X |
| 2,736,219 | 2/1956 | May | 81/52.4 |
| 2,770,997 | 11/1956 | Hansen . | |
| 3,327,380 | 6/1967 | Howlett | 29/152 |
| 3,435,777 | 4/1969 | Schaaf | 411/916 X |
| 3,561,093 | 2/1971 | Gulistan | 29/100 |
| 3,960,047 | 6/1976 | Liffick . | |
| 4,010,669 | 3/1977 | Kloren . | |
| 4,018,132 | 4/1977 | Abe . | |
| 4,035,858 | 7/1977 | Dahl | 10/27 |
| 4,075,923 | 2/1978 | Latham . | |
| 4,085,649 | 4/1978 | Christensson | 411/916 X |
| 5,046,906 | 9/1991 | Bucknell | 411/917 X |

Primary Examiner—Neill R. Wilson
Attorney, Agent, or Firm—Weingram & Zall

[57] ABSTRACT

The present invention provides a method and apparatus for adapting standard threaded fasteners for use with a standard stud tensioner. An adapter has internal and external threads. The internal threads mate with the external thread of the stud to be tensioned. The external threads of the adapter engage the internal threads of a fastening nut having slots on the top thereof for engagement with a turning wrench of the tensioner. The adapter has a central threaded bore on the top portion thereof which is adapted to threadably engage the puller bar of a tensioning apparatus. The stud is elongated by actuation of the tensioner, via the puller bar, lifting the adapter as the stud is tensioned. When appropriate strain is achieved on the stud, the fastening nut is turned down to a fastened position and the stud then can be relaxed.

14 Claims, 6 Drawing Sheets

ADAPTER ASSEMBLY FOR TENSIONING THREADED FASTENERS AND METHOD OF TENSIONING THREADED FASTENERS

BACKGROUND OF THE INVENTION

1. Field Of The Invention

This invention relates to stud tensioning apparatus and more particularly to apparatus to adapt conventional studs for use with stud tensioners.

2. Description Of The Prior Art

Stud tensioners have long been shown to be an effective and superior means of tightening threaded fasteners on studs. However, heretofore, in order to use stud tensioners it was necessary to have specially designed and sized studs and nuts which would mate with the operative parts of the stud tensioners.

Examples of such stud tensioners are shown in U.S. Pat. No. 3,015,975, issued Jan. 9, 1962, to J. L. Biach, and U.S. Pat. No. 3,106,071, issued Dec. 22, 1964, to J. L. Biach, the entire disclosures of which are incorporated herein by reference.

It was, therefore, not possible to adapt the standard type of stud tensioner to existing threaded nut fastening devices because of the absence of the special shapes and sizes necessary for coaction with the stud tensioner.

Many attempts have been made in the past to transform threaded fasteners for attachment to various systems, but none of the prior art contemplated or taught the means or function by which standard threaded fasteners could be effectively adapted for use with stud tensioners.

Taylor, U.S. Pat. No. 1,086,737, discloses a stay bolt which has a tensioning feature for the spherical head of the bolt. This feature relies however, not on any structure internal to the shaft 5, but rather on the exertion of forces directly on the spherical head.

Guy, U.S. Pat. No. 1,965,412, discloses a threaded exterior nut 21 surrounding a threaded shaft 20. A threaded aperture 24 is formed in the upper portion of the shaft. A threaded member 25 having male threaded portion 28 is inserted into the upper portion of the shaft.

Zetterciuist, U.S. Pat. No. 2,320,398, relates to cooling equipment and apparatus where the bolting of a stud is accomplished at very high temperatures.

Muster, U.S. Pat. No. 2,391,031, shows a nut designed for use with sheet metal. The nut has a plurality of tab portions therein designed for mating with an insert which has a threaded internal aperture.

Leufven, U.S. Pat. No. 2,571,265, has a nut 2 engaging bolt 1. The bolt 1 has an internal threaded aperture therein. The device relies on the action of a fluid in annular chamber 16 which is pressurized so as to modify the mechanical forces exerted by the nut/bolt structure.

May, U.S. Pat. No. 2,736,219, utilizes the spring loaded two piece arrangement shown in FIG. 2 as the bolt tensioner.

Hansen, U.S. Pat. No. 2,770,997, particularly FIG. 6, shows an attachment which fits over bolt 11. The attachment 12 has a threaded aperture at the top thereof. The patented invention, however, relies on differing coefficients of thermal expansion between male and female members in the threaded arrangements shown in the patent.

Hewlett, U.S. Pat. No. 3,327,380, discusses wire "tendons" used in prestressed concrete. These tendons are terminated in a threaded collar 24 which interfits into an adjustment piece 18. FIG. 7 of Hewlett shows male stressing members inserted into the internal aperture connected to the shaft 68 via the threaded collar. As described, element 61 is a "jack" having spider legs 63. Housing 66 is hydraulic. Element 67 is a piston standing between the legs 63. The sleeve on the tendon engages the head 71. The tubular coupler 72 has internal threads engaging the sleeve 69 and external threads mounting a nut 73. Piston 67 of the jack 61 is externally threaded for engagement within coupler 72. A shim 74 is interposed between the nut 73 and the bearing plate 64.

Gulistan, U.S. Pat. No. 3,561,093, discloses a method of securing a sleeve to a work piece. The sleeve is provided with an abutment at one end and inserted into an opening in the workpiece. The abutment is thus brought into a position adjacent the surface of the workpiece. A special gripping member having a second abutment and a shank is extended through the sleeve so the second abutment engages the sleeve and the shank projects beyond the opposite sleeve end. A tension is then applied to the shank to hold the first abutment against the work piece surface while simultaneously the opposite end of the sleeve is bend outwardly to form a flange to secure the sleeve to the workpiece. This special purpose tool and the various modifications shown therein is designed for those fasteners which are utilized with structural elements of little strength. The special purpose tool itself providing the forces and counter forces necessary to bend the fastening flange into position.

Liffick, U.S. Pat. No. 3,960,047, discloses a nut having three different diameter threaded apertures therein so that the same nut can be utilized on two different size bolts. This is an automotive device and is designed to interfit different threads of a wheel bolt.

Kloren, U.S. Pat. No. 4,010,669, puts two rings or washers between the bolt 1 and surface of the workpiece 2. These rings or washers are specially shaped and apertured and also have screws so as to be positioned relative to each other. The screws and rings or washers are an added means of control of the stress applied to the nut, and the exert the force on the bolt.

Abe, U.S. Pat. No. 4,018,132, uses a differential pitch thread on two sections of the bolt. The invention is utilized in the connecting rod of an automotive engine.

Dahl, U.S. Pat. No. 4,035,858, relates to a method of bolt manufacture.

Latham, U.S. Pat. No. 4,075,923, discloses a tensioning apparatus "T" which is placed on the end of stud S with the nut end removed. Tensioning apparatus is rotated causing the piston member to threadedly engage the stud S and be drawn toward the flange F leaving the end of stud S projecting externally. Pressure is applied to chamber 17 through ports 9 causing the piston to move from the position shown in FIG. 1 to the upward position shown in FIG. 2. This movement causes stud S to be tensioned. Once the stud is tensioned, the nut N is placed on the disposed end of the stud manually and threaded until it rests against portion 5 of the tensioner housing. The tensioner remains in place, the pressure removed and the desired tension is achieved. An alternative embodiment is shown in FIG. 3. This embodiment has two housing sections 25 and 26 which divide the housing into two piston areas. The lower piston and the lower housing section define a lower annular chamber 37 and the upper piston defines an upper annular chamber 38. In this embodiment pressure is applied to the two chambers forcing both pistons to move upwards, thereby tensioning the stud at increased force over the singular piston embodiment of FIGS. 1 and 2.

SUMMARY OF THE INVENTION

Apparatus

The present invention provides apparatus for adapting standard threaded fasteners for use with standard stud tentioners. An adapter has an internal bore identical with that of a standard threaded fastener for mating with the external thread of the stud to be tensioned. An external thread on the adapter concentrically disposed about the internal thread engages the internal threads of a slotted nut that will be tightly fastened to the stud as a result of the tensioning process. Slots on the top of the nut are formed to engage with the turning wrench of the tensioner. The adapter has a central threaded bore on the top surface which is adapted to threadably engage the puller bar of a tensioning apparatus. Installation of the adapter and mating slotted nut on the end of a stud enables the puller bar of a stud tensioner to engage the assembly to tension the stud for tightening or loosening the nut.

Method

A standard hexagonal nut is removed from an externally threaded stud, and an adapter is threadedly engaged with the stud. A slotted nut adapted to coact with operative elements of a stud tensioner is threadedly engaged with the external threads of the adapter. A threaded puller bar connected to operative sections of the tensioner is threadably engaged with the adapter to secure the assembly to a tensioner. The stud is elongated by actuation of the tensioner, lifting the adapter and nut as the stud is tensioned. When appropriate strain is achieved on the stud, the nut is turned down to the engaging position and the stud can then be relaxed. A dust cover is then placed over the top of the adapter to keep the operative portions of the equip free from accidental damage or contamination.

OBJECTS OF THE INVENTION

Accordingly, it is an object of the present invention to provide apparatus for adapting standard threaded fasteners for use with tensioning apparatus which can be used to retrofit existing equipment.

Another object of the present invention is to provide apparatus for adapting standard threaded fasteners for use with tensioning apparatus which does not require modifying exising studs or threaded members in place.

A further object of the present invention is to provide apparatus for adapting standard threaded fasteners for use with tensioning apparatus which requires a minimum or no additional space for tightening the fastening apparatus.

An additional object of the present invention is to provide apparatus for adapting standard threaded fasteners for use with tensioning apparatus which does not require modifying the location or placement of the studs or the size of the bolt circles that are normally used with these fastening devices.

An object of the present invention is to provide apparatus for adapting standard threaded fasteners for use with tensioning apparatus which is compact, relatively inexpensive, durable, and which is simple in construction, and easy to fabricate, and easy to use.

Another object of the present invention is to provide apparatus for adapting standard threaded fasteners for use with tensioning apparatus which does not have to be removed after use.

A further object of the present invention is to provide apparatus for adapting standard threaded fasteners for use with tensioning apparatus which prevents galling and deterioration of the stud from repeated tightening of the threaded fasteners.

Still another object of the present invention is to provide apparatus for adapting standard threaded fasteners for use with tensioning apparatus which can coact with standard tensioners.

Yet another object of the present invention is to provide a method for adapting standard threaded fasteners for use with tensioning apparatus which enables retrofitting of existing equipment.

A still further object of the present invention is to provide a method for adapting standard threaded fasteners for use with tensioning apparatus which method is simple and can be accomplished easily.

Yet a further object of the present invention is to provide a method for adapting standard threaded fasteners for use with tensioning apparatus which requires no modification of parts on site.

And yet another object of the present invention is to provide a method for adapting standard threaded fasteners for use with tensioning apparatus which method, once performed, requires no additional materials for each cycle of tightening or relaxing the threaded fastener to which the method is applied.

DESCRIPTION OF THE DRAWINGS

These and further objects and advantages of the present invention will become apparent to those skilled in the art from review of the following specification and accompanying drawings in which.

DETAILED DESCRIPTION OF THE INVENTION

Figure 1:
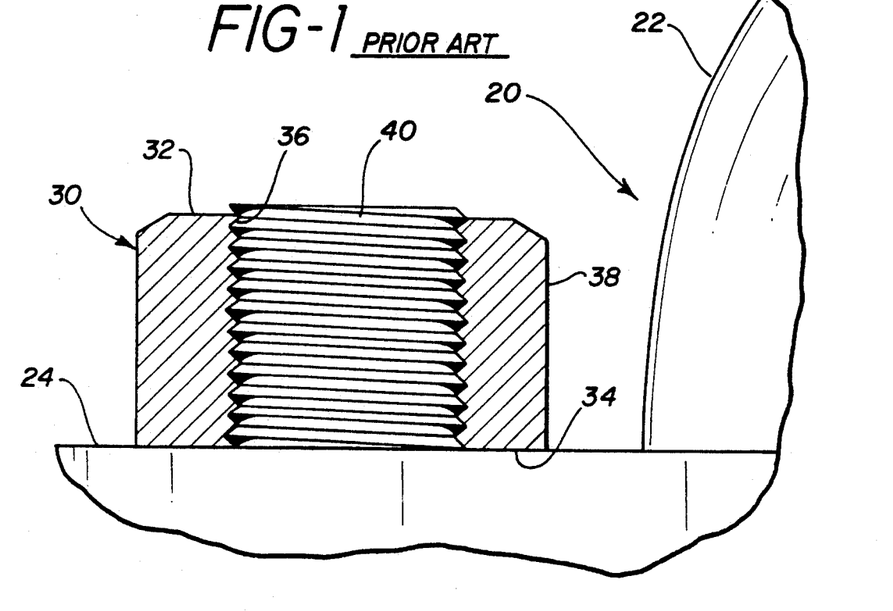
FIG. 1 is a prior art drawing showing an existing stud and standard threaded tightening nut attached thereto.

FIG. 1 shows a prior art fastening device used to fasten a item such as a pressure vessel generally indicated at 20 having a body 22 and a bolting flange 24, a standard hexagonal nut 30 having a top portion 32 with a bottom 34 to bear against the flange 24 has an internal thread 36 and has a flat hex side 38. A stud 40 extends up through the flange and the standard hexagonal nut is threaded down and torqued in order to be tightened against the flange by threadably advancing on the stud.

Figure 2:
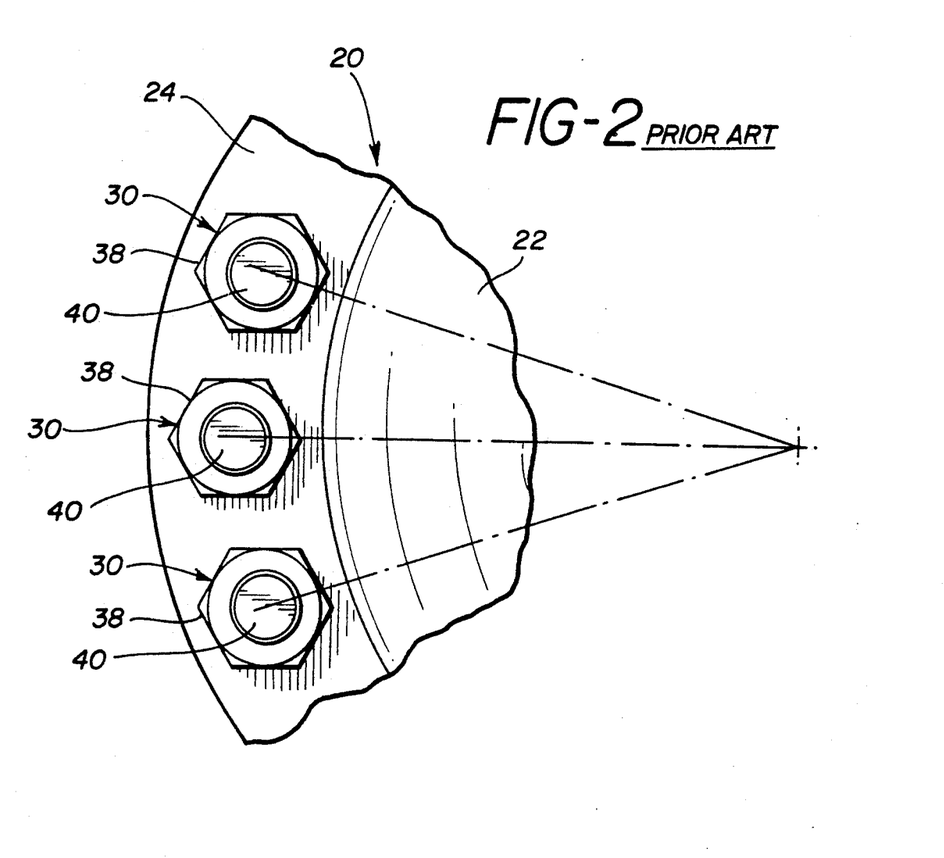
FIG. 2 is a prior art depiction of a bolt circle with existing studs and standard tightening nuts as those shown in FIG. 1.

FIG. 2 shows a bolting circle for the flange in which the studs 40 positioned at equal angular locations in a circular pattern and the nuts 30 with hexagonal sides are threaded onto the studs. The space between the nuts must be sufficient to allow for a wrench or other torquing means which engages the hexagonal flats of the nuts to rotate in order to torque the nuts down.

In FIGS. 3-9, the tensioner adapter system is shown. Once again, the flange 24 has a stud 40 extending above the flange for engagement with fastening means. In this case, the stud is threadably connected to a tensioner adapter assembly consisting of a tensioner adapter nut 70 and a slotted tightening nut 50. The slotted tightening nut will, in effect, act in the same manner as the previous hex head nut to bear down against the flange, but it is tightened not by torquing or rotating to threadably advancing it, but by means of a tensioning apparatus. The tensioning apparatus elongates the stud to allow the tensioning nut to be advanced down to and contact the flange, then the tensioning apparatus is relaxed and the stud is allowed to shrink back and forces the tightening nut down into contact with the flange without any residual torque remaining in the system.

Figure 3:
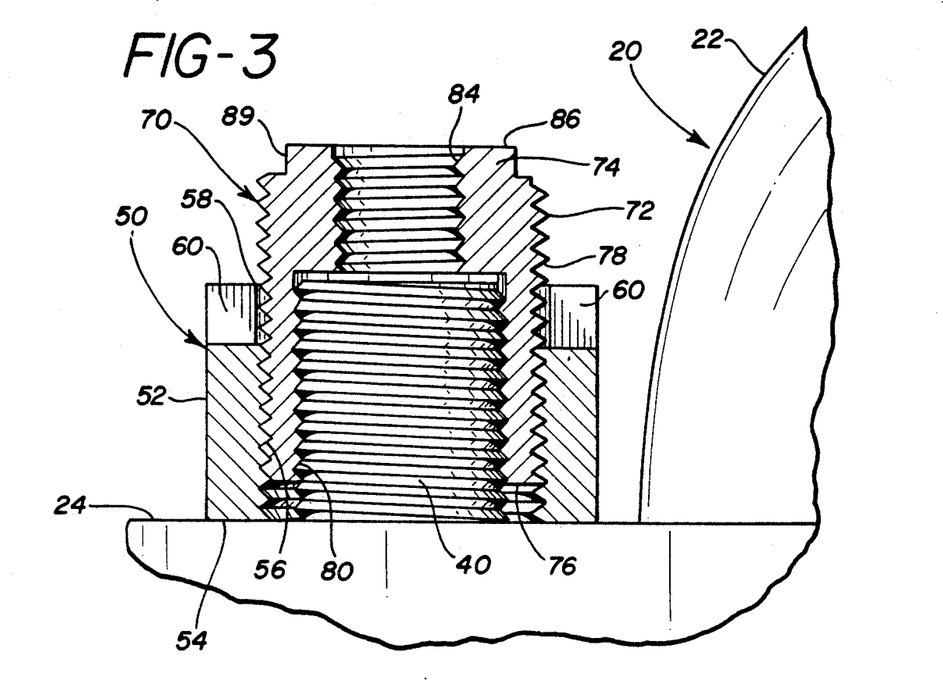
FIG. 3 is a side elevational view of a tensioner adapter assembly replacing the standard tightening nut.

The tensioner adapter nut that enables the use of a tensioner is generally indicated at 70 and consists of a cylindrical sides 72 and a top portion 74. The cylindrical sides end in a bottom surface 76 which is shown in FIG. 3 elevated above the flange. The tensioner adapter nut 70 has an outer external thread 78 adapted to engage an internal thread of the slotted and round tightening nut 56. The tensioner adapter nut 70 has an internal thread 80 on the wall of the tensioner adapter nut which is threadably engaged with the external thread 42 of the stud. A central bore is an internal thread 84 extending from the top surface 86 of the tensioner adapter nut down into the larger bore in which the internal thread 80 is formed.

The outer tightening nut or slotted round nut 50 has a smooth, round external surface 52, and a bottom surface intended 54 intended to bear against the flange. An internal thread 56 is intended to coact with the external thread of the tensioner adapter nut for moving the slotted round nut relative to the tensioner adapter nut. The top surface 58 of the slotted round nut has a series of slots 60 formed in it which are intended to mate with the nut turning sleeve of tensioner as will be described later. This slotted nut is detailed in U.S. Pat. No. 3,162,071 dated Dec. 22, 1964, to Biach, the entire disclosure of which is incorporated herein by reference.

Figure 4:
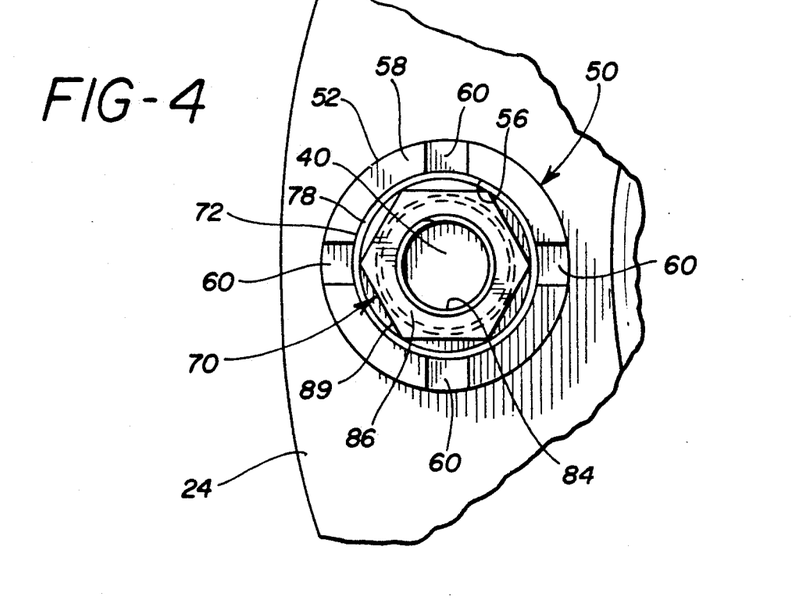
FIG. 4 is a top view of the tensioner adapter assembly shown in FIG. 3.
Figure 5:
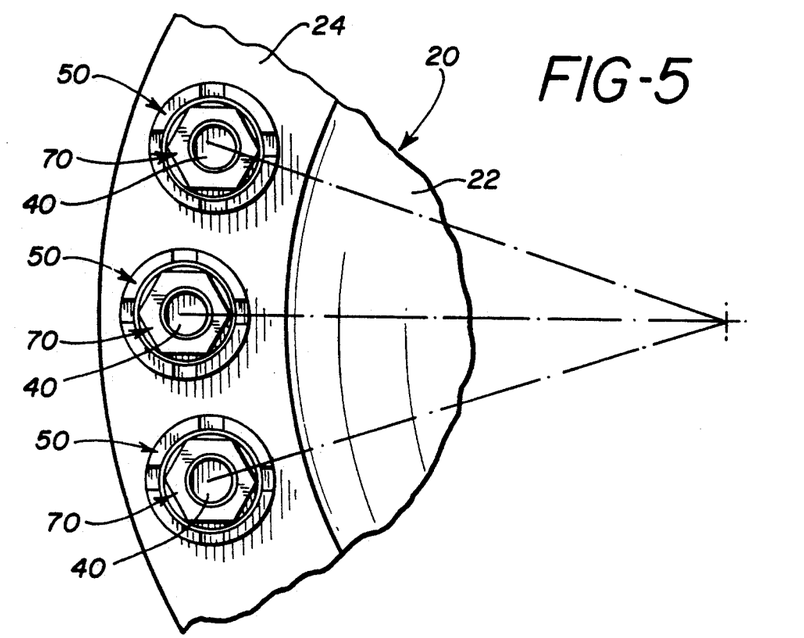
FIG. 5 is a view of the bolt circle of tensioner adapter assemblies installed for the same bolt circle as shown in FIG. 1.

FIG. 4 shows a top view of the slotted round nut and tensioner adapter nut in position over the stud, and FIG. 5 shows the same bolting circle with the slotted round nuts replacing the hexagonal nuts.

Figure 6:
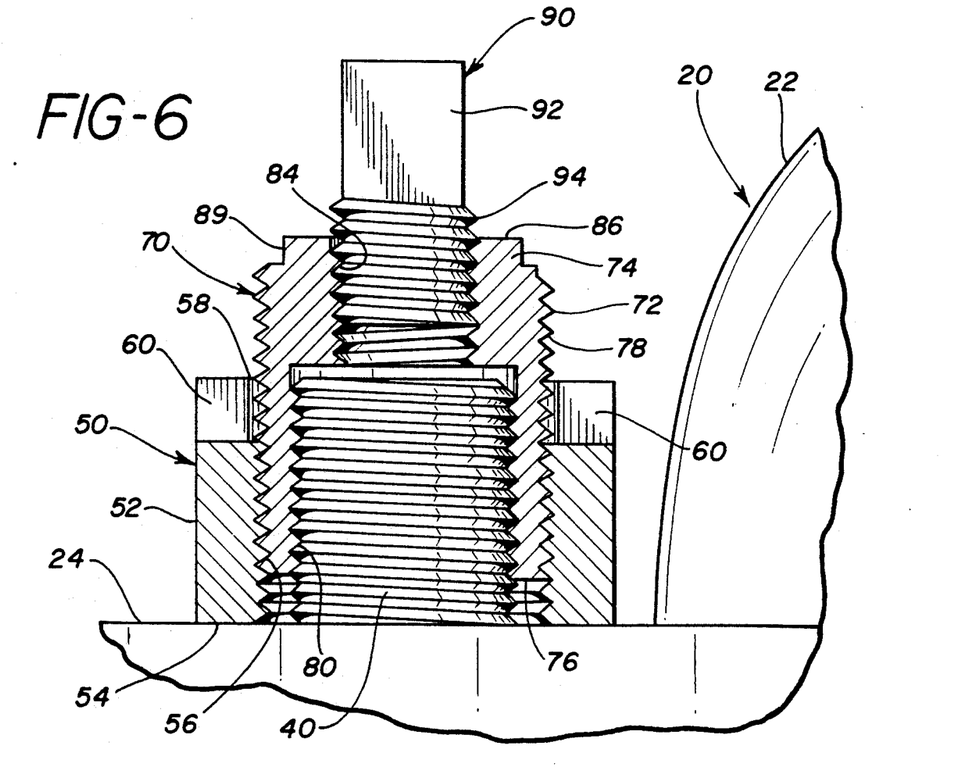
FIG. 6 is a view of the tensioner adapter assembly as shown in FIG. 3 with tensioning apparatus engaged with the adapter assembly.

FIGS. 3, 6, 7, 8 and 9 show the sequence of use of the tensioner adapter assembly. First, the adapter nut 70 is threadably engaged to the stud and the slotted round nut or tightening nut is threaded over the adapter nut to contact the flange. The threading is accomplished by means of a hex flats 89 at the top 74 of the tensioner adapter nut. As shown in FIG. 6, a puller bar, part as generally indicated in 90, having a shaft and an external thread 94 is then threaded down through the bore in the top 74 of the tensioner adapter nut.

Figure 7:
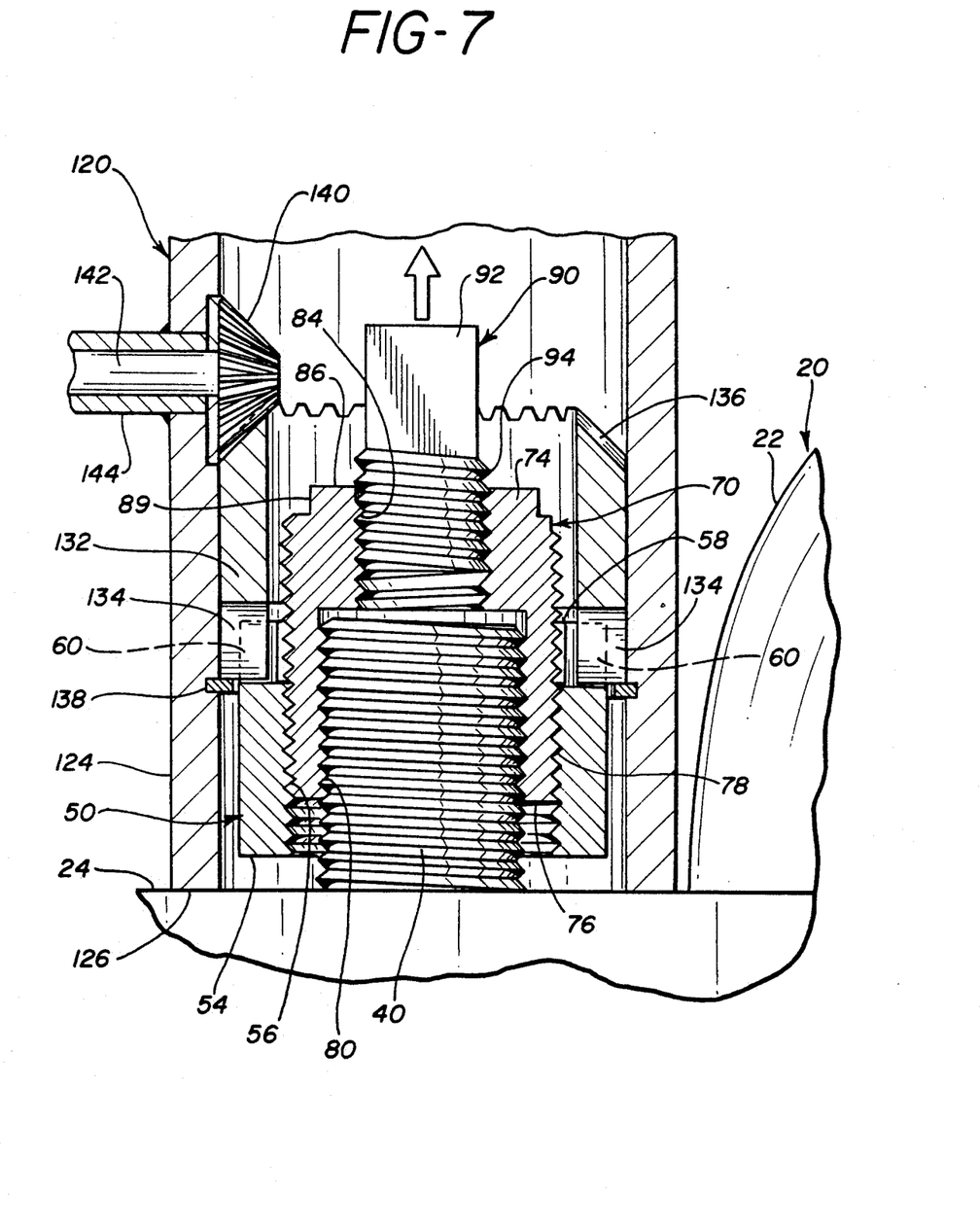
FIG. 7 is a view of the tensioner adapter assembly as shown in FIGS. 3 and 6 and in the process of tensioning the stud and showing portions of the tensioning apparatus.

Once the threads 94 of the puller bar 90 have been engaged with the internal threads 84 of the tensioner adapter nut, the tensioner can be applied. A simple example of such a tensioner, though modified to accommodate the present equipment, as shown in FIG. 7, is shown in U.S. Pat. No. 3,015,975.

As shown in FIG. 7, the tensioner generally indicated at 120 has a housing wall 124 which has a bottom surface 126 that bears against the flange. The puller bar is connected to the cylinders and other equipment within the tensioner that will pull on the puller bar to exert a stress on the stud. As the stud is stressed, it will elongate, and the tensioner adapter nut 70 and accompanying tightening nut or slotted round nut will together rise the distance of the stretch in the stud. Once the appropriate amount of strain has been achieved, the tightening nut turning mechanism in the tensioner will be used to turn the tightening nut down over its threaded connection to the tensioner adapter nut to contact the bottom surface of the nut with the flange. The nut turning mechanism consists of a turning sleeve generally indicated at 132 amounted within the housing which is mounted within the housing and supported by means of the turning sleeve support ring 138. The turning sleeve is rotated by means of a gear rack on the bevelled portion 136 at the top of the sleeve which is driven by a bevelled pinioned gear 140 mounted on a shaft 142 within a bushing 144 that extends through the wall 124 of the tensioner.

Rotation of the pinion gear causes the turning sleeve to rotate and the fingers or slots 134 extending from the turning sleeve engage with the slots 60 and the top of the slotted round nut. The length of the slots cannot exceed the length of stretch of the stud otherwise a disengagement will occur between the turning sleeve and the slotted nut.

Figure 8:
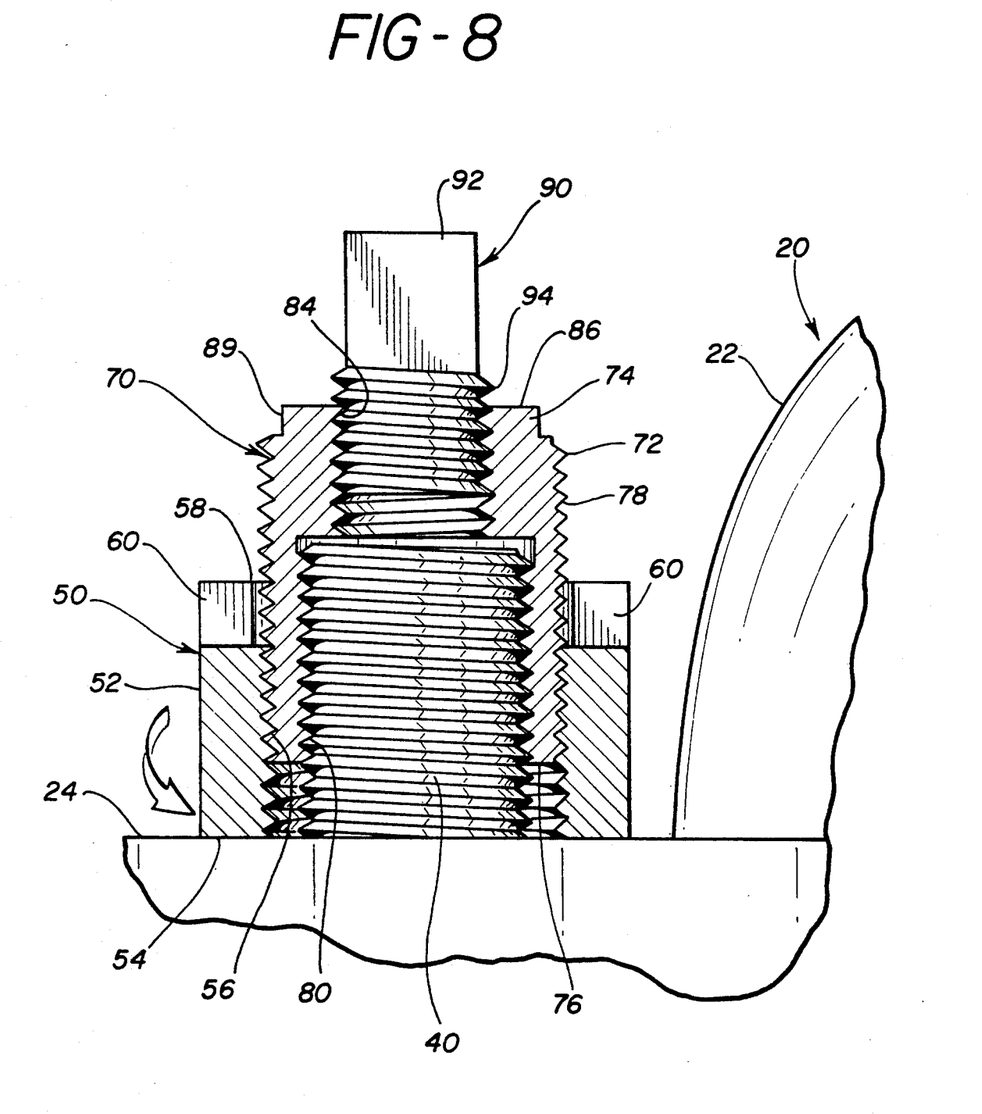
FIG. 8 is a view of the tensioner adapter assembly and stud after elongation of the stud with the tensioner adapter nut turned down.

As shown in FIG. 8, the turning sleeve will turn the slotted nut until it rests against the flange. There is now a relative displacement between the tops of the tensioner adapter nut and the slotted nut that was greater than the initial displacement by the amount of the stretch in the stud.

The tensioner can then be relaxed thereby reducing the stress on the puller bar and allowing it to be withdrawn from the tensioner adapter nut.

Figure 9:
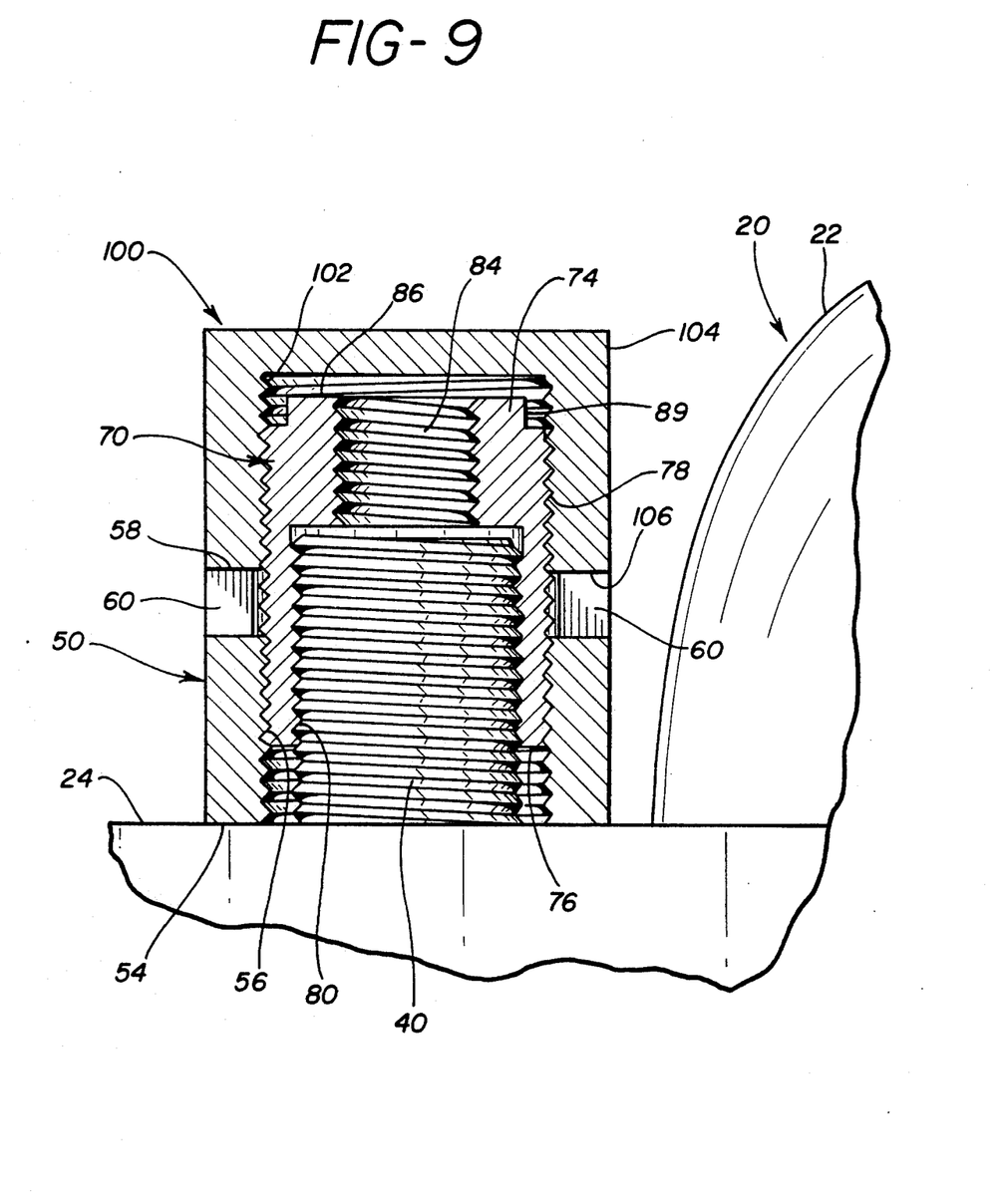
FIG. 9 is a view of the tensioner adapter assembly and stud after the tensioning apparatus has been removed and cover placed on the assembly.

After the puller bar is removed, a dust cover generally indicated at 100, having cylindrical sides 104 and a bottom 106 which abuts the top of the slotted nut is threaded onto the external threads of the tensioner adapter nut by means of internal threads 102.

In the rest position, the circular slotted tightening nut is in tension as is the tensioner adapter nut whose internal and external threads transmit the forces between the tightening nut and the stud to force the nut to bear against the flange.

As can be seen from the above description, the method of adapting fasteners is fairly straightforward and highly effective. First, the old, conventional hex fasteners are removed, then the tensioner adapter nut and slotted round nut are mounted onto the stud. The tensioner adapter nut is advanced down to the full extent of the its thread and the position relative the tensioner adapter nut and the slotted nut is adjusted by relative rotation of the slotted nut to the tensioner adapter nut, so that the tensioner adapter nut is fully threaded on the stud, the slotted nut will in contact or slightly out of contact with the flange.

Next, the puller bar is threaded into the central bore of the tensioner adapter nut, and the puller bar is then forced upward by the tensioner, elongating the stud. The slotted round nut, or tightening nut, is then advanced down along the adapter nut until contact is made with the flange by the bottom of the tightening or slotted round nut. Tension is then relieved on the puller bar, relaxing the connection between the puller bar and the tensioner adapter nut and the puller bar is then removed. A dust cap is threaded onto the tensioner adapter nut to seal the assembly and protect the threads on the tensioner adapter nut and the slots on the top of the round slotted tightening nut.

While the invention is has been described in the detailed embodiments, it is to be understood that the words which have been used are words of description rather than limitation, and that changes may be made within the purview of the appended claims without departing from the true scope and spirit of the invention in its broader aspects.

We claim:

1. A method of adapting a threaded fastener extending from a shaft for use with tensioning apparatus comprising the steps of:
   removing an existing fastening nut from the threaded fastener;
   threading an adapter nut over the fastening shaft for the full length of the shaft;
   threading a fastening nut over the adapter nut;
   positioning the tensioner about the threaded shaft and adapter nut and fastening nut;
   threading a puller bar from the tensioner into a threaded receptacle of the adapter nut to connect the tensioner to the adapter nut;
   pulling the puller bar means to stretch the fastening shaft and thereby lift the fastening nut connected to the adapter nut off the flange from which the threaded shaft extends;
   threading the fastening nut along the adapter nut until it contacts the flange through which the fastening shaft extends;
   relaxing the tension on the puller bar to relax the upward stress on the tensioner adapter nut and create a downward stress on the tensioner adapter nut by the action of the threaded shaft;
   unthreading the puller bar from the tensioner adapter nut, removing the tensioner from about the tension threaded shaft and fastening nut assembly; and
   threading a dust cap over the exposed end of the tensioner adapter nut.

2. A method for adapting conventional threaded shafts for use with tensioning apparatus comprising:
   fastening an adapter nut, having upper and lower portions, on the top of a fastening shaft;
   threading a fastening nut on the adapter nut;
   connecting a tensioning apparatus to the upper portion of the adapter nut;
   pulling the adapter nut with the tensioning apparatus to stretch the fastening shaft;
   threading the fastening nut along the adapter nut beyond the adapter nut to contact the fastening nut with a flange through which the fastening shaft extends;
   relaxing the tension on the tensioning apparatus; and
   disconnecting the tensioning apparatus to leave the fastening nut held firm to a flange by the tension in the fastening shaft.

3. The method of claim 2 further comprising the step of fastening the tensioning apparatus to the adapter nut at the portion of the adapter nut extending beyond the fastening nut.

4. The method of claim 2 further comprising, after the step of disconnecting the tensioning apparatus, the step of installing a dust cap.

5. The method of claim 2 further comprising, prior to the step of fastening an adapter nut over the fastening shaft, the step of removing a nut from the fastening shaft.

6. The method of claim 2 wherein the step of fastening the adapter nut over the fastening shaft includes the step of threading the adapter nut over the fastening shaft.

7. The method of claim 2 wherein the step of connecting the tensioning apparatus to the adapter nut comprises the step of threading a puller bar into a threaded receptacle in the upper portion of adapter nut.

8. An apparatus for adapting a fastening shaft extending through a support surface for tensioning by a tensioning apparatus comprising:
   an adapter nut to be disposed about a fastening shaft, the adapter nut having upper and lower portions;
   means on said adapter nut for connecting said adapter nut to a fastening shaft;
   means on said adapter nut for connecting said adapter nut to a fastening nut;
   a fastening nut disposed about the adapter nut and moveable along the entire length of the adapter nut;
   means on said fastening nut for connecting the fastening nut to the adapter nut;
   means for moving the fastening nut along the adapter nut to bring the fastening nut into contact with the support surface; and
   means on said adapter nut for connecting the upper portion of the adapter nut to a tensioning apparatus.

9. The apparatus according to claim 8 wherein the adapter nut further comprises internal threads within a top portion of said adapter nut for receiving a puller bar from a tensioning apparatus.

10. The apparatus according to claim 8 further comprising cover means connected to said adapter nut.

11. The apparatus according to claim 10, wherein said adapter nut connected to a fastening shaft further comprises:
    means on said adapter nut for transmitting force from a tensioning apparatus to a fastening shaft; and
    means on said adapter nut for transmitting a strain force from a threaded shaft to the fastening nut.

12. The apparatus according to claim 8, wherein said adapter nut connected to a fastening shaft further comprises:
    internal threads in the upper portion of the adapter nut for connecting the adapter nut to a tensioning apparatus;
    means on said adapter nut for connecting said adapter nut to a fastening shaft comprising internal thread means on the inner walls of said adapter nut;
    hex flat means on the top of said adapter nut for rotating said adapter nut;
    means on said adapter nut for connecting said adapter nut to said fastening nut comprising external thread means on walls of said adapter nut;
    means on said adapter nut for transmitting force from a tensioning apparatus to a fastening shaft comprising said internal threads in the top of said adapter nut and the internal threads of said adapter nut; and means on said adapter nut for transmitting force from a fastening shaft to the fastening nut comprising the internal and external threads on the adapter nut.

13. The apparatus of claim 12 wherein the fastening nut moveable along the adapter nut further comprises means connecting the fastening nut to the adapter nut in the form of internal thread means;

means for moving the fastening nut axially along the adapter nut, comprising internal thread means to enable the fastening nut to be threaded to said adapter nut; and slots in the top of the fastening nut adapted for connecting to driving means to advance the fastening nut along the adapter nut.

14. An apparatus for adapting a threaded fastening shaft extending from a support surface for tensioning by a tensioner, comprising:

an adapter nut having cylindrical sides and upper and lower portions;

external threads on the cylindrical sides of the adapter nut;

internal threads on the upper and lower portions of the adapter nut;

the internal threads axially disposed in the top portion of the adapter nut adapted to receive a tensioner;

a tightening nut comprising:

internal and external cylindrical walls;

an internal thread disposed on the internal cylindrical wall;

said internal thread adapted to threadably engage the external thread of said adapter nut;

slot means formed at the top of said tightening nut adapted to engage turning means of a tensioner to rotate the tightening nut to move the tightening nut axially along the adapter nut to position the tightening nut against a support surface; and cover means threadably engaged with the external threads of said adapter nut.

* * * * *